United States Patent

[11] 3,587,124

| [72] | Inventors | John R. Cox<br>Lakewood;<br>Joseph E. Mix, Cleveland, Ohio |
|---|---|---|
| [21] | Appl. No. | 792,097 |
| [22] | Filed | Jan. 17, 1969 |
| [45] | Patented | June 28, 1971 |
| [73] | Assignee | Warner and Swasey Company, Cleveland, Ohio |

[54] TOOL HOLDER
6 Claims, 5 Drawing Figs.

[52] U.S. Cl. .................................................. 10/135,
408/240
[51] Int. Cl. .................................................. B23g 1/00,
B23g 5/16
[50] Field of Search .......................................... 10/89, 89
(F), 89 (H), 129, 135, 136, 141 (H)

[56] References Cited
UNITED STATES PATENTS

| 2,505,030 | 4/1950 | Cote .......................... | 10/89 |
| 3,178,739 | 4/1965 | Plummer et al ............... | 10/129 |
| 2,751,614 | 6/1956 | Bourguignon ................ | 10/89 |
| 3,214,773 | 11/1965 | Benjamin et al. ............. | 10/135 |
| 3,343,190 | 9/1967 | Lutz ............................ | 10/135 |
| 3,381,550 | 5/1968 | Smith .......................... | 10/129 |

Primary Examiner—Richard J. Herbst
Assistant Examiner—E. M. Combs
Attorney—Bosworth, Sessions, Herrstrom and Cain ABSTRACT: A tool holder for supporting a thread cutting tool on a machine tool for cutting a thread in a workpiece, the tool holder normally being supported on the machine tool slide for lineal movement therewith and the workpiece being mounted on the machine tool spindle for rotation therewith. The tool holder includes means for compensating for deviations from correct synchronization of the rotational movement of the workpiece and spindle and the axial movement of the threading tool carried by the tool holder. The tool holder further includes separate means for permitting limited reverse movement of the machine spindle prior to the start of the retracting movement of the machine slide upon completion of a threading operation without damage to the thread or tap.

PATENTED JUN 28 1971
3,587,124
SHEET 1 OF 2
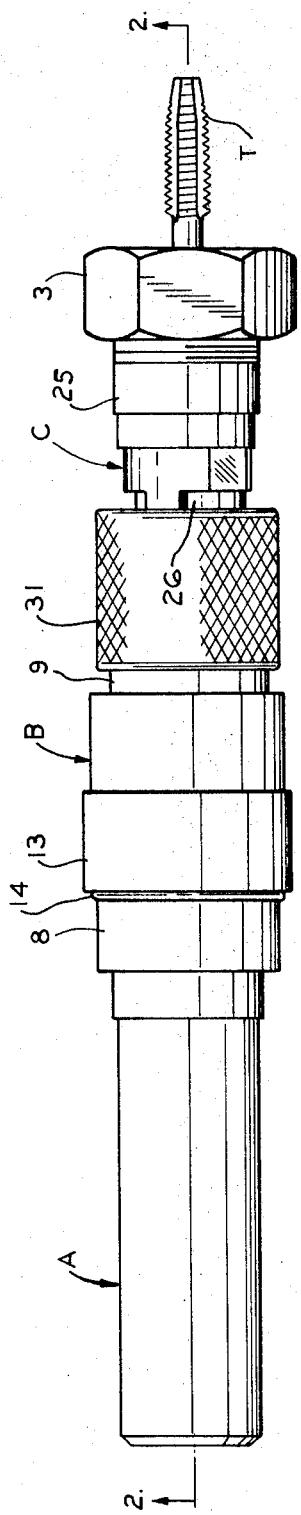
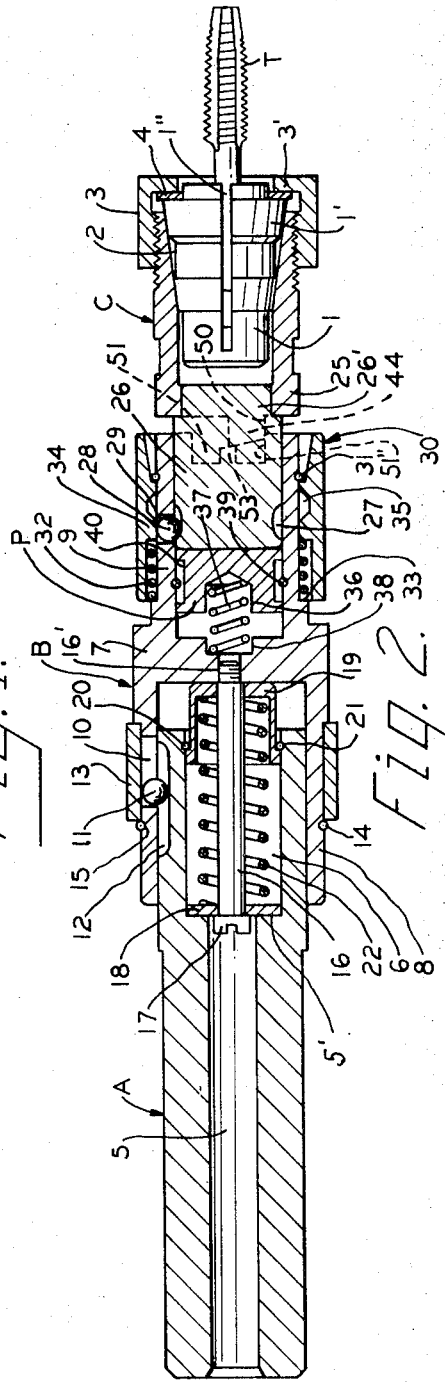
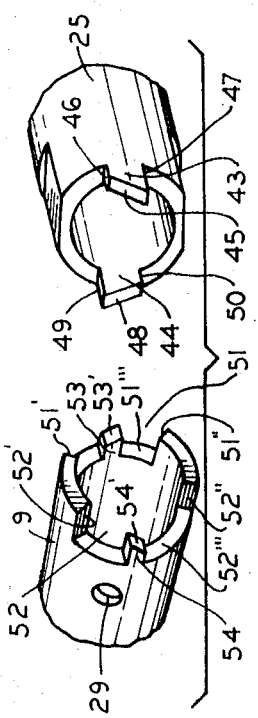
INVENTORS.
JOHN R. COX
JOSEPH E. MIX
BY Bosworth, Sessions,
Herrstrom & Cain
ATTORNEYS.

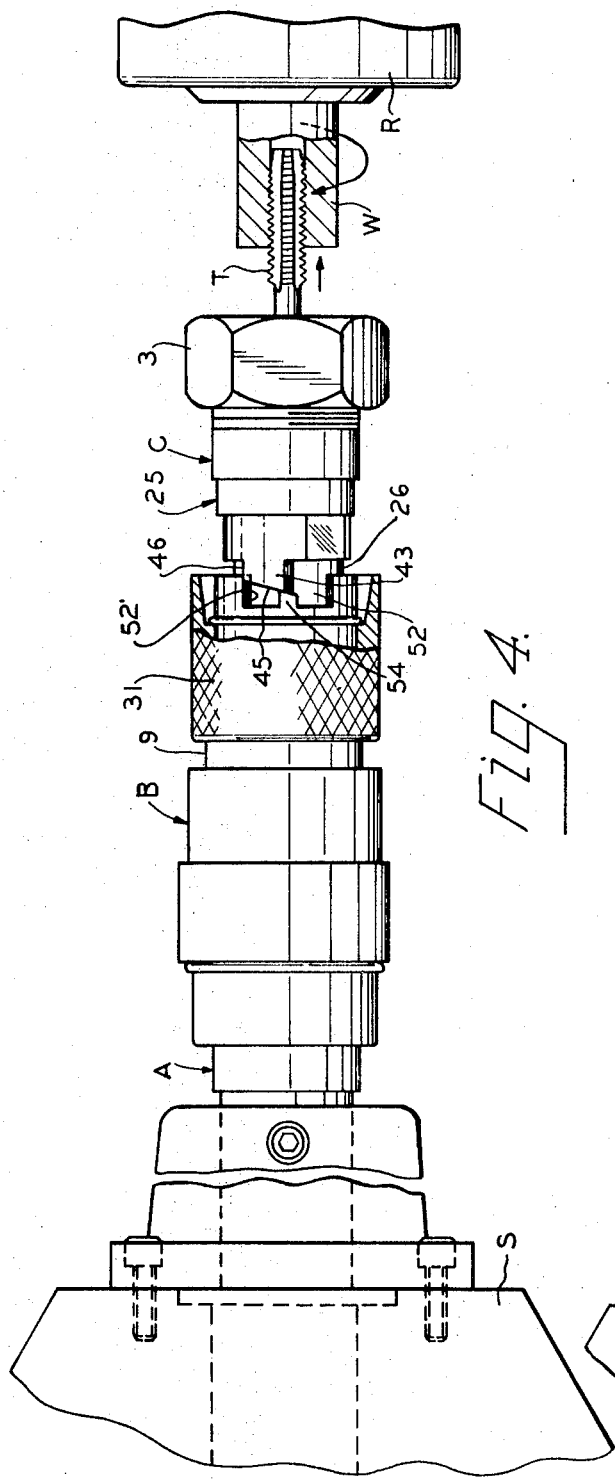
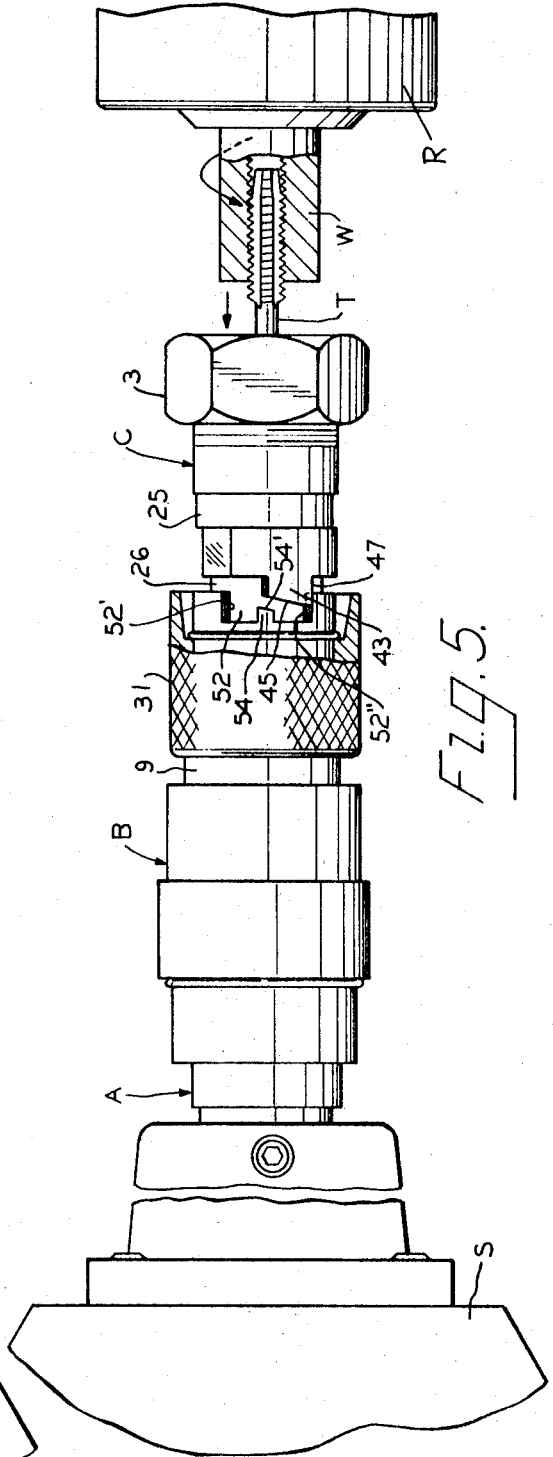
INVENTORS.
JOHN R. COX
JOSEPH E. MIX
BY Bosworth, Sessions
Herrstrom & Cain
ATTORNEYS.

TOOL HOLDER

BACKGROUND OF THE INVENTION

In describing the present invention reference will be made to a tap holder and to the operation of tapping a hole in a workpiece on a machine tool. It will be understood however, that the improved tool holder might be adapted to support a die and accordingly, where the term "tap" is used herein it is intended to comprehend and include dies as well as taps.

In carrying out tapping operations on a machine tool it is common practice to support the workpiece on the rotating spindle of the machine and to support the tap in a tool holder mounted on a tool slide of the machine which has driven axial movement toward and away from the rotating spindle and workpiece. The rate of rotation of the workpiece and the rate of lineal feed of the tool slide are so correlated, for tapping any particular size thread, that preferably the tool slide will advance the tap at the same rate as the lead of the thread being cut. However, at times the rate of feed of the machine slide, either in advancing or retracting direction, may be either faster or slower than it should be to synchronize the lineal movement of tap exactly with the rotation of the workpiece on the machine spindle. Various means have been proposed for compensating for such differences. These means have usually involved a spring interposed between two axially movable parts of the tool holder device whereby the overall length of the tool holder may be extended or contracted against the spring if and when the slide feed and spindle rotation are out of synchronization.

In one form of compensating tap holder a single spring is utilized, the device having a normal centered or balanced position for the two parts of the tool holder, the spring being compressible in opposite directions to permit extension or contraction of the overall length of the tool holder. In such a device the spring must be stiff enough to apply sufficient pressure of the tap to the workpiece to initiate the tapping operation. As a tap holder, to be useful in practice, should be adapted to take taps of a substantial range of sizes this compensating spring should be heavy enough to start the largest size tap which would be used in the particular holder. It has been found when such a tap holder is used with a very small tap to cut a fine thread in a small hole such a spring may cause injury to the threads, or damage to or breakage of the tap, if the machine tool slide does not begin to retract immediately upon reversal of rotation of the spindle at the completion of the tapping operation.

In many machine tools, particularly after they have been in use for some time, there is sufficient lost motion in the driving connections between the spindle to the tool slide that there is a definite lag between the start of the reverse rotation of the spindle and the start of the retracting movement of the slide and tap. When using small taps to cut fine threads as referred to above the spring of the previous compensating tap holders, if heavy enough to start the largest tap for which the holder is designed, will be of such strength that when small size taps are used the tap may break or the threads may be damaged because the spring will not yield sufficiently to permit retracting movement of the tap when the workpiece reverses but the tap does not immediately retract.

SUMMARY OF THE INVENTION

Accordingly, it is an object of the present invention to provide a compensating tap holder which is adapted for use with taps of a substantial range of sizes and with which, even when used with taps of the minimum size for the holder in question, no damage to the tap or the threads being formed will result from lost motion in the machine tool which causes delay in the retraction of the machine slide and tap holder after the spindle is reversed on completion of the tap advance. Other objects of the invention include the provision of a compact, rugged tap holder of the type described having a minimum of working parts and which is particularly adapted for high-speed production operations.

Generally speaking, the improved tool holder includes a shank adapted to have fixed support on a machine tool slide, an intermediate tap chuck receiving member supported on the shank and adapted to have axial sliding movement relative thereto, and a tap chuck removably mounted on the intermediate member and adapted to receive and grip a range of tap sizes. A relatively heavy compensating spring is interposed between the shank and intermediate member so that the intermediate member normally is maintained at a neutral or centered position but may be moved in either direction relative to said shank against said spring with resulting extension or contraction of the overall length of the tool holder. The tap chuck is provided with a quick detachable connection to the intermediate member so that taps may be changed merely by exchanging tap chucks. Furthermore, fall-away or lost motion driving connections are provided between the intermediate member and the tap chuck whereby, upon reversal of the machine tool spindle at the completion of tap advancing operation, the tap may be moved by reverse rotation of the workpiece a limited distance axially in retracting direction toward the machine slide while the tap is held against rotation, even though the tool holder shank has not yet started to retract. The only opposition to such axial movement of the tap is that provided by a relatively light backup spring which will not impose sufficient load on the tap, or the threads which have been cut, to cause damage thereto.

BRIEF DESCRIPTION OF THE DRAWINGS

FIG. 1 is an elevational view of the tap holder of this invention with a tap secured in position therein and the parts in the positions they assume while the tap is being advanced into the workpiece.

FIG. 2 is a cross-sectional view taken substantially on line 2-2 of FIG. 1.

FIG. 3 is an illustrative perspective view of the end portions of the intermediate sleeve member and the tap chuck which are adapted to engage and provide the "fall-away" or lost motion connection therebetween.

FIG. 4 is an elevational view generally similar to FIG. 1 but showing the tap holder mounted in the slide of a machine tool and the tap engaging a workpiece rotatably mounted on the spindle of the machine tool, the locking and releasing sleeve of the tap chuck being partially broken away to show the fall-away drive parts in the positions they assume while a thread is being cut.

FIG. 5 is a view similar to FIG. 4 but illustrating the parts in positions they assume when the thread is completed and the initial simultaneous reverse rotation of the workpiece, tap and tap chuck has occurred.

DESCRIPTION OF THE ILLUSTRATED EMBODIMENT

Referring particularly to FIGS. 1 and 2, the illustrated tap holder includes a shank A which has supported thereon for limited longitudinal movement relative thereto an intermediate tap chuck receiving member B. A tap chuck C is detachably mounted in the intermediate member B and the tap T is removably secured in the tap chuck C in any suitable manner.

As illustrated, the tap T is gripped in a contractable collet 1 having a conical outer surface 1' and being slotted longitudinally as seen at 1''. The conical surface 1'of the collet 1 engages a corresponding conical bore 2 in the tap chuck C. A nosepiece or nut 3 has threaded engagement with a corresponding thread on the tap chuck C and has an inwardly extending flange 3' which is adapted, when the nut 3 is tightened, to exert a force through the thrust washer 4 against the collect 1, forcing same into the tapered bore 2 and contracting the collect into firm gripping engagement with the shank of the tap T. When it is desired to change tap sizes the nut 3 is removed from the tap chuck C and a new collet of proper size to receive the new tap is installed.

The shank A, as seen in FIGS. 4 and 5, is adapted to be releasably mounted in the slide S of a machine tool and has a bore 5 extending from its inner (left hand in the drawings) end into an enlarged spring chamber 6 which extends to its outer (right-hand) end. The intermediate sleeve member B includes a center web portion 7 from which an inner tubular sleeve 8 extends toward the shank A and an outer tubular sleeve 9 extends in the opposite direction.

As best seen in FIG. 2, the inner tubular sleeve 8 of intermediate member B has a sliding fit on the outer (right-hand) end of shank A and is provided with longitudinally extending slots 10 of a width just slightly greater than the diameter of the connecting and driving balls 11. These balls 11 are movable lengthwise in slots 10 in sleeve 8 and extend into elongated grooves 12 in the shank A. In FIG. 2 of the drawings only one slot 10, groove 12 and ball 11 is seen but it will be understood a plurality of these ball and groove connections, for example three, are preferably uniformly spaced around the circumference of the shank A.

In the assembly of the intermediate member B on the shank A the tubular sleeve 8 is slid over the end of the shank A, the slots 10 and the groove 12 are radially aligned, and a ball 11 is positioned in each of the slot and groove locations. A retaining sleeve 13, which has a sliding fit on the outer surface of tubular sleeve 8, is then positioned to cover the slots 10 and hold balls 11 therein and also in the grooves 12. Retaining sleeve 13 is conveniently held in position by a removable spring wire snap ring 14 which engages a circumferential groove 15 in the sleeve 8.

This ball and groove connection between the shank A and the intermediate member B permits limited relative longitudinal movement therebetween while providing an effective driving connection and preventing relative rotational movement between the shank A and intermediate member B.

The center web 7 of intermediate member B has a tapped hole which receives and holds the threaded end 16' of an elongated stud 16 which extends longitudinally through the spring chamber 6 of shank A. This stud 16 has a screwdriver slotted head 17 at its inner (left-hand) end and a spring engaging washer 18 is slidable mounted on the screw 16 and also has a loose sliding fit in the spring chamber 6.

At the opposite end of spring chamber 6 is a spring receiving cup 19 which at its outer (right-hand) closed end has a sliding fit on the stud 16 and at its inner open end has a sliding fit in the spring chamber 6. A spring wire retaining ring 20 is snapped into an annular groove 21 in the wall of the spring chamber 6 after the cup 19 is inserted in the chamber 6 and acts as a stop to limit movement of the cup 19 outwardly of the spring chamber 6 (to the right in FIG. 2).

Surrounding the stud 16 is a compensating spring 22 which extends between the washer 18 and the cup 19. In the assembly of the device this spring is placed under a compression preload and it will be seen from FIG. 2 that it will, when at rest with no longitudinal force exerted on intermediate member B, hold said member B in a centered or neutral position on the shank A with the balls 11 approximately midway of the length of the grooves 12 (se FIG. 2).

The function of this compensating spring 22 will be more fully described later but it is presently noted that if the shank A is held in fixed position and a force is exerted on the intermediate member B to move same away from shank A (to the right in FIG. 2) the head 17 of stud 16 will move the washer 18 to the right, compressing spring 22 against the closed end of groove 19. This compression will occur because cup 19 is prevented from moving to the right by the retaining ring 20. When the force is released the spring 22 will return the sleeve B to the position of FIG. 2.

If, on the other hand, a force is exerted on sleeve B to move it toward shank A, this force will be transmitted through the center web 7 of member B to the closed end of cup 19. The cup 19 will move toward the shank A (to the left in FIG. 2) and the stud 16 will have corresponding movement, its head end passing through washer 18 into the bore 5 in shank A. As washer 18 abuts the shoulder 5' between bore 5 and spring chamber 6 of shank A, it cannot move to the left and the spring 22 will be compressed. Release of the force against the sleeve B will permit the preloaded spring 22 again to move sleeve B into its neutral or centered position of FIG. 2.

The slot, groove and ball connections 10, 11 and 12 between the sleeve B and the shank A permit these axial or longitudinal movements of the sleeve B on the shank A and, as will appear later, permit lengthening or shortening of the overall length of the tap holder while maintaining positive rotary driving connection between the shank and sleeve.

The tap chuck C has an outer tubular portion 25 in which a tapered bore 2 is formed to receive and support the collet 1. The shank portion 26 of chuck C has an outer (right-hand in FIG. 2) end 26' which has a pressed fit in tubular portion 25 to form a substantially integral tap chuck body assembly. A circumferential groove 27 extends around the shank 26 portion adjacent its inner end and is adapted, when the shank 26 is inserted into the outer tubular sleeve portion 9 of intermediate member B, to receive the tap chuck retaining balls 28. As in the case of the connecting and driving balls 11 between the shank A and intermediate member B, only one of the retaining balls 28 is seen in FIG. 2 but it will be understood that a plurality (preferably three) will normally be employed. These balls 28 are carried in radial holes 29 extending through the sleeve portion 9 of intermediate member B, the inner diameter of the holes 29 being reduced to prevent passage of the balls 28 entirely therethrough while permitting them to extend into the groove 27 of the tap chuck shank 26 as seen in FIG. 2.

A ball retaining and tap chuck locking and releasing sleeve 30 is slidably mounted on the outer surface of tubular sleeve portion 9 of intermediate member B and a retaining ring 31 fits in a groove in tubular portion 9 and is adapted to engage sleeve 30 ad limit its outward movement (to the right in FIG. 2). A compression spring 32 lies in a recess in sleeve 30 and extends between a shoulder 33 on sleeve 9 and the bottom of the recess in sleeve 30. This spring 32 normally holds sleeve 30 in the position seen in FIG. 2 against the sleeve stop ring 31.

When in this position an annular rib 34 on the inside of sleeve 30 will overlie the holes 29 and hold the balls 28 in the groove 27 in a tap chuck C. To release the tap chuck C and permit its removal from intermediate member B the sleeve 30 is moved to the left (FIG. 2) against spring 32 until the annular groove 35 overlies the balls 28. This will permit the balls to move radially outwardly into the groove 35 and completely out of groove 27 in chuck C so that the shank portion 26 of the chuck C may be pulled out of sleeve portion 9 of intermediate member B.

Slidably mounted in the tubular sleeve 9 is a tap chuck backing plunger P. This plunger has an outer end adapted to engage the inner end of shank 26 of tap chuck C. A recess 36 in the opposite end of plunger P receives the relatively light (only a few ounces compression rating) compression tap holder backup spring 37, the opposite end of which extends into a recess 38 in, and abuts against, center web 7 of the intermediate member B.

Referring to FIG. 2, it will be seen that when the tap chuck C is held in the intermediate member B by the balls 28 the plunger P, under the influence of tap holder backup spring 37, pushes the tap chuck c out until the inner (left-hand) edge of the groove 27 engages the balls 28 and blocks chuck c against further outward movement. It will also be noted that the axial dimension of groove 27 is greater than the diameter of balls 28 so that the tap chuck C may have limited axial inward movement in the sleeve 9 from the position seen in FIG. 2 until the balls 28 engage the outer edge of groove 27. Such inward movement will be opposed only by the light backup spring 37. The axial movement of plunger P is limited in both directions from the position seen in FIG. 2 by a wire snapring 39 mounted in a groove in the inner surface of sleeve 9 and lying in a reduced diameter portion 40 of the outer surface of the plunger P.

The operation of the above described quick detachable tap chuck retaining means to permit quick mounting or removal of a tap chuck on the intermediate member B will now be described.

Assuming that the parts are in the positions of FIG. 2, to remove the tap chuck C the sleeve 30 is moved to the left until its inner end engages the adjacent shoulder on the member B and the groove 35 overlies the balls 28. The spring 37 will now move the plunger P outwardly forcing the tap chuck C out beyond the balls 28 which are moved into the overlying groove 35. The outward movement of plunger P is stopped when the inner edge of groove 40 engages the ring 39. At this time the outer end of plunger P will overlie the holes 29 and thus will hold the balls 28 out in the groove 35 and the retaining sleeve 30 will remain in its retracted position. When a tap chuck C is again inserted into the sleeve portion 9 of intermediate member B the inner end of the shank portion 26 will engage the outer end of plunger P and will pass by the balls 28 until the groove 27 is in alignment with the balls 28. When this occurs the spring 32 will move the retaining sleeve 30 to the right and the inclined inner sidewall of groove 35 will cam the balls 28 into the groove 27. When the sleeve 30 is stopped in its outward movement by the spring ring 31 the annular rib 34 will overlie the balls 28 and retain them in locking position, thus holding the tap chuck C securely in the intermediate member B as seen in FIG. 2.

The "fall-away" or lost motion driving connections between the intermediate member B and the tap chuck C are best seen in FIGS. 3, 4 and 5. Tubular sleeve portion 25 of cam chuck C has a pair of opposed cam lugs 43 and 44 projecting from its inner (left hand as seen in the drawings) end. Lug 43 has an inclined cam face 45 and axially extending stop faces 46 and 47. In like manner cam lug 44 has an inclined cam face 48 and axial stop faces 49 and 50. These cam lugs are clearly seen in FIG. 3 in which the inner end of tubular portion 25 of tap chuck C is illustrated in perspective with the shank portion 26 ommitted for clearness of illustration. As seen in FIGS. 2, 4 and 5, shank portion 26 of the tap chuck C is pressed into the end of tubular portion 25 so that, in the completed tap chuck unit, the cam lugs 43 and 44 lie against the outer surface of the shank portion 26.

The adjacent (FIG. 3) open end of the outer tubular sleeve 9 of intermediate member B is formed with opposed notches 51 and 52, the axially extending end walls of which 51', 51'', 52' and 52'' form pairs of stop faces adapted to be engaged respectively by the stop faces 49, 50, 46 and 47 of the cam lugs 43 and 44 as will be later described. Projecting radially outwardly from the bottom wall 51''' of notch 51 is a cam abutment 53 having an inclined end face 53' (see FIG. 3). Similarly disposed on bottom wall 52''' of notch 52 is a cam abutment 54 having an inclined end face 54'. It will be noted that the cam abutments 53 and 54 do not extend axially outwardly as far as the outer end of the tubular sleeve 9.

When the tap chuck C is inserted into the open end of sleeve portion 9 of intermediate member B the cam lugs 43 and 44 extend into the notches 51 and 52 and the inclined cam faces 45 and 48 on the cam lugs are opposed to the correspondingly inclined end faces 54' and 53' of the cam abutments 53 and 54. The lugs 43 and 44 are shorter in their circumferential dimension than the width of the notches 51 and 52 into which they extend and thus limited rotational movement of the tap chuck C relative to the intermediate member B is permitted. As previously noted, the groove 27 in the shank end 26 of tap chuck C receives the retaining balls 28 and is sufficiently wide to permit limited axial or endwise movement of the tap chuck C in the sleeve 9 of the intermediate member B.

As seen in FIGS. 2 and 4 the tap chuck C is in its outermost position with the retaining balls 28 against the inner (left-hand) edge of the groove 27. The stop face 26 on cam lug 43 is in engagement with the stop face 52' of the notch 52 and the high end of inclined cam face 45 is positioned opposite the high end of the similarly inclined cam face 54' on cam lug 54. In like manner, as seen on dotted lines in FIG. 2, stop face 50 or cam lug 44 is in engagement with the stop face 51'' of the notch 51.

The position of the parts in FIGS. 2 and 4 which has just been described is that which they assume during the tap advancing or thread cutting portion of a tapping operation. Referring to FIG. 4, the shank A of the tap holder is mounted in the tool slide S of a machine tool and a workpiece W is suitably secured in the rotating spindle R of the machine tool. It will be understood that before starting a tapping operation the slide S is retracted so that the tap T is out of engagement with the workpiece W.

To start tapping a hole in workpiece W the machine spindle R is rotated at a predetermined speed and the slide S is advanced at a predetermined rate which is correlated with the speed of rotation of the spindle R and the lead of the thread which will be cut by the tap T. Normally, the slide feed is designed to be such that the tap will advance into the workpiece without substantial endwise thrust or force between the tap and the workpiece. As the spindle R and workpiece W rotate in the direction of the arrow in FIG. 4 (counterclockwise as viewed from the tool slide S) the tap holder C, in which the tap T is firmly secured, will be urged in the same direction and the cam lugs 43 and 44 and the cam abutments 53 and 54 will be in the positions described above and shown in FIG. 4. The cam lugs are at the limit of their rotational movement in one direction relative the intermediate member B and relative rotation between the tap chuck C and the member B is prevented by this engagement of the stop faces. Relative axial movement of the tap chuck C toward the sleeve B is also prevented by the engagement of the inclined cam faces 45 and 48 of the cam lugs with the inclined end faces 54' and 53' respectively of the cam abutments 53 and 54.

When the desired depth of thread is reached the spindle R is reversed so that the workpiece W will rotate in the opposite direction as indicated by the arrow in FIG. 5. As previously noted, due to manufacturing tolerances, wear, or improper adjustment it is a usual occurrence for the start of the retracting movement of the machine tool slide to lag, more or less, the reversal of the machine spindle and workpiece. When such a lag occurs, if no means are provided to compensate for it, the threads may be damaged or the tap may break because, if the workpiece reverses and the tap can neither rotate nor move in retracting direction, something has to give.

When the spindle R and the workpiece W are reversed at the end of the tap advance the first movement that occurs is a rotary movement of the spindle S, workpiece W, tap T, and tap chuck C from the positions seen in FIG. 4 to the positions seen in FIG. 5 with the cam lugs at the other limits (as compared to FIG. 4) of their possible rotational movement relative to intermediate member B. This rotational movement of tap T and tap chuck C takes place because the tap T is frictionally held in the threads in the workpiece W and will rotate in reverse direction with the workpiece until the stop face 47 on cam lug 43 engages stop face 52''of notch 52 in sleeve 9. When this occurs the parts will be in the positions seen in FIG. 5. There can be no further reverse rotation of the tap T and tap chuck C and there will be an axial clearance between the cam face 45 on the tap chuck C and the end face 54' on cam abutment 54.

As further rotary movement of the tap chuck c and the tap T in retracting direction is prevented, any further rotation of the workpiece W will cause the tap T to move to the left as seen in FIG. 5. If at this time the slide S has started its retracting movement the tap holder and tap will be moved to the left out of the workpiece W without substantial axial force being imposed on the tap or the threads in the workpiece. However, if the tool slide S has not yet started to retract because of lost motion due to wear or for any other reason, a certain amount of further rotation of the workpiece W on the tap T, without rotation of the tap T, may occur with the result that the tap T and the tap chuck C will be pushed to the left (FIG. 5) without corresponding movement of intermediate member B. This movement of the tap will be opposed only by the light spring 37 which backs up the plunger P.

This axial movement of the tap T and tap chuck c relative to workpiece W and sleeve member B can continue until the axial clearance clearly seen in FIG. 5 between the cam lug 43 and the cam abutment 54 is taken up. At or before this time the tool slide S will have started its retracting movement.

It will be understood that all or any part of this axial clearance may be taken up by the time the tool slide starts to retract, depending on the amount of lag between the spindle and the tool slide. As the light spring 37 offers very little resistance to axial movement of the tap and tool slide, no damage to threads that have been cut in the workpiece, or to the tap, will be incurred even through very fine threads are being formed in very small holes. It is this lightly opposed fall-away action of the present tool holder which makes it particularly advantageous for tapping small and fine thread holes.

The main compensating spring 22 in shank A is primarily effective in permitting the advance or retraction of the slide S at a rate either faster or slower than in exact synchronism with the thread being formed during the tapping operation. If the tool slide S feeds the tap at a rate faster than the thread is being formed the spring 22 will be compressed from left to right as seen in FIG. 1, the head 17 of screw 16 will move into bore 5 and the overall length of the tap holder will decrease. On the other hand, if the tool slide feed is slower than the thread advance, the spring 22 will be compressed from right to left, the washer 18 will move to the right in chamber 6 and the overall length of the tool holder will increase. This floating or compensating action is effective and desirable during the cutting of the threads or the withdrawal of the tap, particularly with relatively large diameter taps cutting relatively coarse threads.

Upon the completion of a tapping operation and withdrawal of the tap from the workpiece the tap chuck C is in the position shown in FIG. 5 with the cam lugs 43 and 44 in their tap retracting positions. It is a feature of the present device that when the next tapping operation is started the device immediately and automatically sets itself in tapping position. This occurs because, with the parts in the positions of FIG. 5, when the tap is advanced and first contacts the workpiece W the tap chuck C will immediately be rotated in counterclockwise direction into the position of FIG. 4 in which the tap chuck and tap are positively held against both rotational and axial movement relative to the intermediate sleeve B and the tool slide S. Thus no manual presetting of the device is required between tapping operations.

From the above description it will be seen that the tap holder disclosed herein compensates for departures from exact correlation of tap feed and workpiece rotation and also, by the "fall-away" connection, affords protection against damage to a thread which has been cut, and to the tap itself, which might otherwise occur upon reversal of a machine tool spindle where there is a delay in the start of the retraction of the tool slide, particularly when tapping small holes with fine threads.

Although the illustrated embodiment of the invention has been described in considerable detail it will be understood that variations and modifications in the specific form and arrangement of the parts may be made without departing from the spirit of this invention. Accordingly, we claim as our invention all embodiments thereof coming within the scope of the appended claims.

We claim:

1. In a tool holder having a shank, an intermediate member and a tap chuck, said intermediate member being mounted for axial movement on said shank, compensating spring means between said shank and intermediate member adapted normally to hold said intermediate member in a neutral position and permit axial movement thereof in either direction from said neutral position against said spring means, means for mounting said tap chuck on said intermediate member, lost motion driving connections between said intermediate member and said tap chuck whereby limited relative axial and rotational movement of said tap chuck and intermediate member are permitted and backup spring means, relatively light as compared to said compensating spring means, positioned between said intermediate member and said tap chuck for urging said tap chuck outwardly of said intermediate member.

2. A tool holder as described in claim 1 in which said means for mounting said tap chuck on said intermediate member provide a quick detachable connection therebetween.

3. A tool holder as described in claim 1 in which said lost motion driving connections include a pair of circumferentially spaced stop faces on said intermediate member, a cam abutment on said intermediate member disposed between said stop faces, and a cam lug on said tap chuck adapted, when said tap chuck is mounted on said intermediate member, to be disposed between said spaced stop faces on said intermediate member in axial alignment with said cam abutment, the circumferential length of said cam lug being less than the circumferential distance between said stop faces on said intermediate member whereby said tap chuck may have limited rotational movement relative to said intermediate member.

4. A tool holder as described in claim 3 in which said intermediate member is formed with a plurality of said pairs of stop faces thereon and said tap chuck has a corresponding number of said cam lugs thereon adapted to be disposed one between the stop faces of each of said pairs.

5. A tool holder as described in claim 3 in which said cam abutment on said intermediate member and said cam lug on said tap chuck have opposed inclined faces adapted, when said cam lug is at the limit of its rotational movement in one direction relative to said intermediate member to abut and prevent relative axial movement of said tap chuck and intermediate member and, when said cam lug is at the other limit of its rotational movement relative to said intermediate member, to permit limited axial movement between said tap chuck and intermediate member.

6. A tool holder as described in claim 5 in which said intermediate member is formed with a plurality of said pairs of stop faces thereon and said tap chuck has a corresponding number of said cam lugs thereon adapted to be disposed one between the stop faces of each of said pairs.

PO-1050
(5/69)

UNITED STATES PATENT OFFICE
CERTIFICATE OF CORRECTION

Patent No. 3,587,124          Dated December 3, 1971

Inventor(s) John R. Cox and Joseph E. Mix

It is certified that error appears in the above-identified patent and that said Letters Patent are hereby corrected as shown below:

In the Heading [73] Assignee

"Warner and Swasey Company, Cleveland, Ohio"

should be

-- The Warner & Swasey Company, Cleveland, Ohio --

Signed and sealed this 25th day of April 1972.

(SEAL)
Attest:

EDWARD M. FLETCHER, JR.
Attesting Officer

ROBERT GOTTSCHALK
Commissioner of Patents